United States Patent [19]

Bassett et al.

[11] 4,039,500

[45] Aug. 2, 1977

[54] PROCESS FOR CONTROLLING MOLECULAR WEIGHT DISTRIBUTION OF LATEX POLYMERS

[75] Inventors: David Robinson Bassett, Charleston; Kenneth Look Hoy, St. Albans, both of W. Va.

[73] Assignee: Union Carbide Corporation, New York, N.Y.

[21] Appl. No.: 624,597

[22] Filed: Oct. 22, 1975

[51] Int. Cl.$^2$ .............................................. C08L 25/14
[52] U.S. Cl. ....................... 260/29.6 R; 260/29.6 TA; 260/29.7 R; 260/29.7 T; 260/29.7 SQ; 526/80; 526/87
[58] Field of Search .............. 526/80, 87; 260/29.6 R, 260/29.6 TA, 29.6 Z, 29.7 R, 29.7 T, 29.7 SQ

[56] References Cited

U.S. PATENT DOCUMENTS

| 3,562,235 | 2/1971 | Ryan .................................... 260/885 |
| 3,562,240 | 2/1971 | Miletto et al. ................... 260/29.7 R |
| 3,804,881 | 4/1974 | Bassett ................................. 260/807 |

Primary Examiner—M. J. Welsh
Attorney, Agent, or Firm—Francis M. Fazio

[57] ABSTRACT

Particle morphology and molecular weight distribution of latex polymers is controlled by a process wherein a primary polymerizable feed composition, (a) a crosslinker and (b) a chain transfer agent during at least a portion of the period of addition of said composition to the polymerization zone, is fed into a polymerization zone while simultaneously feeding a secondary polymerizable feed composition containing chain transfer agent to the primary polymerizable feed composition and thus continually varying the compositional content of the primary polymerizable feed composition.

11 Claims, No Drawings

PROCESS FOR CONTROLLING MOLECULAR WEIGHT DISTRIBUTION OF LATEX POLYMERS

BACKGROUND OF THE INVENTION

There recently issued two United States patents pertaining to new methods for carrying out polymerization processes. In the first of these, U.S. Pat. No. 3,804,881 (Apr. 16, 1974), there was disclosed and claimed a process for the addition polymerization of monomers and in the second, U.S. Pat. No. 3,839,293 (Oct. 1, 1974) there was disclosed and claimed a process for narrowing the molecular weight distribution of polymers produced by condensation polymerization reactions.

While both of these processes represent a significant breakthrough in the polymer field, there are instances in which one requires polymers having a broader molecular weight distribution. This is particularly true when dealing with latex compositions since the polymer particles in the latex should, generally, preferably possess good particle coalescence properties to obtain the desired film characteristics of good gloss and flexibility.

SUMMARY OF THE INVENTION

It has now been found that the particle morphology and molecular weight distribution of emulsion polymerized latex polymers can be controlled. This control is achieved by the proper selection and addition of chain transfer agent, alone or in conjunction with crosslinker, to the emulsion polymerization reaction by the process of this invention. In this process, at least one primary polymerizable ethylenically unsaturated monomers feed composition, initially with or without chain transfer agent present, is introduced to a polymerization zone. Simultaneously, at least one secondary polymerizable ethylenically unsaturated monomers feed composition containing a chain transfer agent is added to the primary polymerizable ethylenically unsaturated monomers feed composition so as to continually change the compositional content of the primary polymerizable ethylenically unsaturated monomers feed composition during this addition thereto. Also simultaneously the primary polymerizable ethylenically unsaturated monomers feed composition introduced to the polymerization zone reacts and produces an emulsion polymerized latex polymer of broadened molecular weight distribution and having the desired particle morphology.

DESCRIPTION OF THE INVENTION

The use of emulsion polymerized latexes in the coating and ink fields is of great commercial importance. Within the recent past the importance of the aqueous emulsion latexes has increased since they do not contaminate the atmosphere with large quantities of organic solvent vapors, water being the predominant liquid vehicle for the latex polymer particles.

In aqueous latex emulsions the particle morphology and molecular weight distribution of the polymer particles have significant effects on the properties of the dry films or coatings obtained from the latex. These characteristics are effected to a large extent by the manner in which the reaction is carried out and by the particular reactants and amounts thereof used in the emulsion polymerization process. Studies of emulsion polymerization processes have shown that under certain reaction conditions such processes are rapid in rate and that surface polymerization on the particle surface tends to predominate over bulk polymerization in the particle. This had led to the development of complicated polymerization processes using multi-step feeding techniques in which separate and distinct monomers mixtures are sequentially added to the reactor from different tanks leading to particle structures resembling the structure observed in an onion, namely, discrete and separate layers, each distinctly different from its adjacent layer and each representing the composition of the monomers mixture feed introduced to the reactor. These particles do not show a gradual, consistent and even transition in molecular structure.

A more desirable particle morphology would be that in which the change in molecular structure in the particle is one such as is represented by the gradual, consistent and even change observed in a spectrum; one in which there is no abrupt change or onion-like structure but rather a smooth transition from one phase to the next similar to that observed in the color changes of the light spectrum. We have now found a process whereby the particle morphology and molecular weight distribution of emulsion polymerized latex polymers can be adjusted in a controlled manner to produce a spectrum-like particle structure.

The process of this invention is used to produce emulsion latex polymers of the desired particle morphology and broader molecular weight distribution in a controlled manner. In emulsion polymers, these properties are used to advantage in affecting the colloidal properties of the latex emulsions or dispersions and improving the physical properties of the polymers. It is known that surface polymerization predominates over bulk polymerization in the particles in emulsion polymerization reactions, due to the fast conversions that occur, and that the polymer composition of the surface region of each particle reflects the composition of the monomers feed stream at a particular time during the polymerization. What was not known was how to control the growth of the particles to produce a spectrum-like particle morphology and a broader molecular weight distribution at the same time. The ability to do so permits the production of emulsion latexes having different properties than those observed in latexes produced by the prior known processes. For instance, a spectrum-like particle structure latex can now be produced with the particle morphology designed to have a soft core gradually changing to a hard exterior; such products exhibit better impact strength properties. One can also produce particles having a hard core gradually changing to a soft exterior. Further, it is now also possible to effectively place the functional groups in exposed locations on the latex polymer particles while still maintaining control over the viscosity of the latex emulsion, a useful morphological characteristic when subsequent reaction of the latex is desired.

Emulsion polymerization reactions are characterized by their high rate of reaction, which is attributed to the fact that the polymer radicals are located in distinct particles that are separated by water and thus more readily available to the free monomers present and by the fact that the viscosity within the particles increases rapidly with conversion thus causing a decrease in the rate of diffusion of the macroradicals produced. These two effects serve to reduce the rate of radical termination by recombination and as a consequence high molecular weight polymers are produced at high rates of reaction.

Though high molecular weight polymers generally have good tensile properties, in a latex a high molecular weight serves to impede film formation because of the reduced ease of particle coalescence. We have now found that molecular weight distribution is very important in latexes to be used in coatings and films and that we can control the distribution by the processes of this invention so as to produce emulsion latexes that are comercially acceptable and that have good coating flexibility, barrier properties, durability and gloss and rheological properties for ease of application.

In the process of this invention a chain transfer agent is used to control the particle morphology and to broaden the molecular weight distribution of the emulsion polymerized latex polymers. The chain transfer agent is used alone or in conjunction with a crosslinking agent; with the latter combination generally preferred since it permits a broader control of variation of the polymer and generally results in better gloss and flexibility properties of films produced therefrom.

Chain transfer agents are known in the polymer art and any of the known compounds can be used. This invention is not the selection of any specific chain transfer agent, it is an improved process involving control of molecular weight distribution by a defined, heretofore undisclosed, method of using the chain transfer agents. Among the chain transfer agents that are useful in our process are the linear or branched alkyl mercaptans having from 1 to 24 carbon atoms, or more, preferably from 4 to 12 carbon atoms; aryl mercaptans having from 6 to 14 ring carbon atoms; alkanols having from 1 to 12 carbon atoms, preferably from 1 to 4 carbon atoms; halogenated alkanes and alkenes having from 1 to 6 halogen atoms, preferably 1 to 4 halogen atoms, and from 1 to 12 carbon atoms, preferably from 1 to 4 carbon atoms; further, any of the other known types of chain transfer agents can be used provided they do not unduly interfere with the polymerization reaction, such as some of the aldehydes.

The chain transfer agents can be unsubstituted or they can be substituted with groups which do not have a significantly adverse effect on the polymerization reaction.

The chain transfer agent can be present either in the primary polymerizable ethylenically unsaturated monomers feed composition, or in the secondary polymerizable ethylenically unsaturated monomers feed composition, or in both of said feed composition; preferably in the secondary polymerizable ethylenically unsaturated monomers feed composition. The concentration in a particular feed composition can vary from 0 to 5 weight percent thereof, preferably from 0.05 to 1 weight percent thereof, most preferably from 0.1 to 0.5 weight percent thereof, with the proviso that there must be a positive amount thereof present in at least one of said feed compositions during at least a portion of the polymerization period.

Illustrative of suitable chain transfer agents one can mention methyl mercaptan, ethyl mercaptan, propyl mercaptan, isopropyl mercaptan, the butyl mercaptans, sec.-butyl mercaptan, isobutyl mercaptan, n-butyl mercaptan, t-butyl mercaptan, the pentyl mercaptans, neopentyl mercaptan, the hexyl mercaptans, the octyl mercaptans, the decyl mercaptans, the undecyl mercaptans, the dodecyl mercaptans, stearyl mercaptan, O-mercaptabenzoic acid, mercaptoacetic acid, 3-mercapto-1, 2-propanediol, 2-methyl-2-propanethiol, butyl-1, 4-dimercaptan, phenyl mercaptan, tolyl mercaptan, benzyl mercaptan, chlorophenyl mercaptan, naphthyl mercaptan, xylyl mercaptan, methanol, ethanol, propanol, isopropanol, butanol, isobutanol, t-butanol, the pentanols, the hexanols, the heptanols, benzyl alcohol, chloroethane, fluoroethane, chlorofluoroethane, trichloroethylene, and the likes.

The polyvinyl crosslinkers can be present either in the primary polymerizable ethylenically unsaturated monomers feed composition, or in the secondary polymerizable ethylenically unsaturated monomers feed composition, or in both of said feed compositions; preferably in the primary polymerizable ethylenically unsaturated monomers feed composition. The concentration in a particular feed composition can vary from 0 to 5 weight percent thereof, preferably from 0.05 to 1 weight percent; with the proviso that there must be a positive amount thereof present in at least one of said feed compositions during at least a portion of the polymerization period.

Among the crosslinkers one can mention divinyl benzene, acrylyl or methacryl polyesters of polyhydroxylated compounds, divinyl esters of polycarboxylic acids, diallyl esters of polycarboxylic acids, triallyl cyanurate, allyl acrylate, allyl methacrylate, diallyl terephthalate, N,N'-methylene diacrylamide, diallyl maleate, diallyl fumarate, hexamethylene bis maleimide, triallyl phosphate, trivinyl trimellitate, divinyl adipate, glyceryl trimethacrylate, diallyl succinate, divinyl ether, the divinyl ethers of ethylene glycol or diethylene glycol, ethylene glycol diacrylate, polyethylene glycol diacrylates or methacrylates, 1, 6-hexanediol diacrylate, pentarethritol triacrylate or tetraacrylate, tri — or tetraethylene glycol diacrylate or methacrylate, neopentyl glycol diacrylate, the butylene glycol diacrylates or dimethacrylates, trimemylolpropane di — or tri — acrylates, and the like.

As indicated, the use of the chain transfer agents, and crosslinkers in the emulsion polymerizations according to the processes of this invention permit control of molecular weight distribution so that latex compositions are obtained that have broader molecular weight distributions. Those skilled in the art are fully familiar with the emulsion polymerization processes and in view of this general, well-known knowledge, it is unnecessary for us to include detailed explanations of conventional reaction conditions, reactants, proportions thereof, catalysts, stabilizers, colorants or other materials conventionally used in emulsion polymerizations; the acquired knowledge thereof being known to the average skilled individual. Our invention is an improved and novel process not heretofore known to those skilled in the art that enables him to produce an emulsion latex polymer of desired broader molecular weight distribution and of controlled particle morphology. Use of this process permits the production of latex polymers having a broader molecular weight range and more uniform morphology than would be obtained from the same components under the prior art procedures. That this could be accomplished by this process was unexpected and unobvious.

In the process of this invention, emulsion polymerized latex polymers are produced by a process in which a primary polymerizable ethylenically unsaturated monomers feed compositions containing from 0 to 5 weight percent thereof of a chain transfer agent that is present in a primary feed source is introduced to a polymerization zone; simultaneously with the addition of said primary polymerizable ethylenically unsaturated monomers feed composition to the polymerization zone there is added secondary polymerizable ethylenically unsaturated monomers feed composition containing from 0 to 5 weight percent thereof of a chain transfer agent that is present in a secondary feed source to the primary feed source. Preferably, the initial concentrations of chain transfer agents in the two monomers feed zones are different. During the simultaneous flows from secondary feed source to primary feed source and from primary feed source to polymerization zone there is a continual variation in the compositional content of reactants in the primary feed source; thus, there is also a continual variation or change in the compositional content of the reactants mixture that is introduced into the polymerization zone. The critical feature of this process is the introduction of primary polymerizable ethylenically unsaturated monomers feed composition to a polymerization zone from at least one primary feed source while simultaneously continually changing the compositional content of said primary polymerizable ethylenically unsaturated monomers feed composition by introducing at least one secondary polymerizable ethylenically unsaturated monomers feed composition from at least one secondary feed source to said primary polymerizable ethylenically unsaturated monomers feed composition in the primary feed source. When the amount of chain transfer agent or crosslinker initially present in the secondary feed source is greater than the amount thereof initially present in the primary feed source, the concentration thereof in the primary feed source increases as the feeds progress. When the amount of chain transfer agent or crosslinker initially present in the secondary feed source is less than the amount thereof initially present in the primary source, the concentration thereof in the primary feed source decreases as the feeds progress.

The polymerization zone is any reactor, properly equipped, that can be used for the production of emulsion polymers. The different types of reactors and their suitability for a particular emulsion polymerization reaction are well known to those skilled in the art and do not require elaboration herein. Connecting to the polymerization zone or reactor is at least one primary feed source. The term primary feed source defines one or more tanks or source of polymerizable reactants feeding directly into the polymerization zone or reactor, for example, it can be an in-line mixer or a tank. The primary feed source is equipped with efficient mixing means to assure adequate mixing of the monomers contents thereof. Connecting, in turn, to any of the primary feed sources is at least one secondary feed source. The term secondary feed source defines one or more tanks or sources of polymerizable reactants feeding to any of the primary feed sources. There can be one or more secondary feed sources with all of the secondary feed sources feeding directly into the primary feed source, or one or more of the secondary feed sources can feed in series to another secondary feed source and thoroughly mixed therein with finally an ultimate secondary feed source feeding directly into one or more of the primary feed sources. The rate of feed from any one feed source to any other feed source or tank, whether primary or secondary, can be varied at the will of the skilled scientist to meet his desires and objectives. The configurations that can be engineered are many; however, in all instances there must be a polymerization zone or reactor connected to at least one primary feed source or tank equipped with mixing means which in turn is connected to at least one secondary feed source or tank, which secondary feed sources (when more than one thereof is used) can all or in part feed directly into one or more of the primary feed source or tank or can feed in series into one another and ultimately feed into the primary feed source or tank.

The primary polymerizable ethylenically unsaturated monomers feed composition is the mixture of reactants present at any particular time in the primary feed source or tank. This mixture can contain the polymerizable unsaturated monomers reactants chain transfer agents and crosslinkers, or it can include any other additive which will not have a deleterious effect on the polymerizable unsaturated monomers reactants, for example, diluents or solvents, colorants, dispersion or emulsion agents, antioxidants, stabilizers, catalysts or initiators, and the like. The compositional content of the primary polymerizable ethylenically unsaturated monomers feed composition is continually changing as secondary polymerizable ethylenically unsaturated monomers feed composition is fed into and mixed with it. By the term compositional content is meant the content or concentration in the polymerizable ethylenically unsaturated monomers feed composition of each reactant therein. As becomes apparent from this teaching and description the simultaneous feeding of primary polymerizable ethylenically unsaturated monomers composition from the primary feed source to the polymerization zone and feeding of a different secondary polymerizable ethylenically unsaturated monomers feed composition from the secondary feed source to the primary feed source will result in a continual change of the content or concentration of each reactant present in the primary polymerizable ethylenically unsaturated monomers feed composition or in the compositional content of the primary polymerizable ethylenically unsaturated monomers feed composition. This continual change in compositional content can also occur in a secondary polymerizable ethylenically unsaturated monomers feed composition when more than one thereof is being used and they are feeding in series into each other before ultimately feeding into the primary polymerizable ethylenically unsaturated monomers feed composition. The secondary polymerizable ethylenically unsaturated monomers feed composition is the mixture of reactants present at any particular time in any one or more of the secondary feed sources or tanks and can contain the same types of additives that were previously indicated could be present in the primary polymerizable feed composition.

As indicated, in the process of this invention there are used primary polymerizable ethylenically unsaturated monomers feed compositions and secondary polymerizable ethylenically unsaturated monomers feed compositions. The primary polymerizable ethylenically unsaturated monomers feed composition can initially contain a single polymerizable reactant or it can initially contain a single polymerizable reactant or it can initially contain a plurality of polymerizable reactants; the same is true for the initial content of the secondary polymerizable ethylenically unsaturated monomers feed composition. However, when the primary polymerizable ethylenically unsaturated monomers feed composition is a single monomer reactant the secondary polymerizable feed composition cannot be solely that same single monomer reactant, it can be a different single monomer reactant or a mixture of a plurality of monomer reactants that can include that same monomer reactant in the mixture. Likewise, when the primary polymerizable ethylenically unsaturated monomers feed composition is a mixture of a plurality of monomer reactants the secondary polymerizable ethylenically unsaturated monomers feed composition cannot be that same mixture having the same concentrations for each reactant, it can be a single monomer reactant or it can be a different mixture of monomer reactants or it can be a mixture of the same monomer reactants but at different initial concentrations of the monomer reactants. The important and ever present factor is that the initial compositional contents of the primary polymerizable ethylenically unsaturated monomers feed composition and of the secondary polymerizable ethylenically unsaturated monomers feed composition are always different, they are not initially identical in make-up of polymerizable reactants.

Control of the particle morphology and molecular weight distribution is best achieved in our process when the chain transfer agent is originally present in the secondary polymerizable ethylenically unsaturated monomers feed composition so that its concentration in the primary polymerizable ethylenically unsaturated monomers feed composition fed to the polymerization zone gradually increases during a portion of the polymerization reaction. It is also preferred in such instance to have the crosslinker originally present in the primary polymerizable ethylenically unsaturated monomers feed composition; this results in a gradual decrease of its concentration in the polymerization zone during the polymerization reaction. This sequence generally provides an emulsion latex that yields coatings having the better overall properties of flexibility and gloss and the emulsions themselves generally exhibit the better viscosity properties. One can also, if desired, use chain terminator only, and depending upon the type of product desired it can be initially present solely in the secondary polymerizable ethylenically unsaturated monomers feed, or solely in the primary polymerizable ethylenically unsaturated monomers feed, or in both of said feeds. As previously indicated, however, better results are generally achieved when the chain transfer agent is originally present in the secondary polymerizable ethylenically unsaturated monomers feed composition.

As a result of the initial differences in the compositional contents of the primary and secondary polymerizable ethylenically unsaturated monomers feed compositions and of the simultaneous addition of secondary polymerizable ethylenically unsaturated monomers feed composition to primary polymerizable ethylenically unsaturated monomers feed composition while the primary polymerizable ethylenically unsaturated monomers feed composition is introduced into the polymerization zone there is a continual variation in the compositional content of the primary polymerizable ethylenically unsaturated monomers feed composition. There is also a continual change in the concentration of chain transfer agent and crosslinker present in each respective polymerizable ethylenically unsaturated monomers feed composition and, thus, of the concentration of the chain transfer agent and crosslinker as it is introduced into the polymerization zone or reactor. This continual concentration change of chain transfer agent and crosslinker in the reacting mixture produces the unexpected and unobvious control of polymer morphology and broader molecular weight distribution that has been achieved. Hence, any portion of the primary ethylenically unsaturated monomers feed composition entering the polymerization zone is at all times different than the portion that preceded it and the portion that succeeds it. Consequently, the composition of the polymer produced in the reactor during the addition is likewise continuously changing and reflects the composition of the primary polymerizable ethylenically unsaturated monomers feed composition entering the polymerization zone. In a rapid polymerization reaction, one wherein there is essentially instantaneous reaction of the monomers when they are introduced to the polymerization zone, one has what is known as a monomer starved system. In other reactions one may have a so-called monomer rich system, i.e., a system in which there is some time delay between introduction of the reactants to the polymerization zone and essentially complete polymerization of the reactants. Thus, in a momomer starved system the polymer produced at any one period of time differs in constitutional content from the polymer produced prior to that period of time or subsequent to that period of time. However, in a monomer rich system the composition of the polymer formed at any instant is dependent upon the residual concentration of each monomer in the polymerization zone and the respective reactivity of each monomer present therein in relation to the other monomers. There are thus produced by the herein process certain novel non-uniform emulsion polymer latex compositions containing polymer molecules of infinite variations in molecular structures and broader molecular weight distribution. The instant invention provides a novel process for the production of emulsion latex polymers and certain novel non-uniform polymers themselves of controlled particle morphology and molecular weight distribution. By the term infinite variation in molecular structures is meant the mixture of the infinite number of different polymers that is produced in the polymerization zone by our process. By the term non-uniform is meant that polymer molecules formed at any one time during the polymerization reaction are not the same as polymer molecules formed at any time immediately preceding or following said time.

The emulsion polymerization process of the invention can be described in its simplest manner by a reaction involving a single primary feed source initially containing a single polymerizable monomer reactant and a single secondary feed source initially containing a single different polymerizable monomer reactant and the chain transfer agent. The contents in the primary feed source or tank at any time during the process being known as the primary polymerizable ethylenically unsaturated monomer feed composition and the contents of the secondary feed source or tank being known as the secondary polymerizable ethylenically unsaturated monomer feed composition. Secondary feed source feeds into primary feed source by suitable lines and pumps; primary feed source is equipped with an efficient stirrer or mixer and feeds into the polymerization zone. At the start of the emulsion polymerization reaction the polymerization zone or reactor is charged with the requisite amount of water, initiator or catalyst and surfactant and the flow of primary polymerizable ethylenically unsaturated monomer feed composition from primary feed source to the polymerization zone is commenced at a predetermined rate, simultaneously the flow of secondary polymerizable ethylenically unsaturated monomer feed composition containing the chain transfer agent from secondary feed source to the primary feed source is initiated and this rate of flow can be the same as or different than the rate of flow from the primary feed source to the polymerization zone. As the secondary polymerizable ethylenically unsaturated monomers feed composition enters the primary feed source it is thoroughly mixed with the contents thereof resulting in a continual increase in concentration of chain transfer agent therein and in a continual change in the compositional content of the primary polymerizable ethylenically unsaturated monomers feed composition. This continually changing primary polymerizable ethylenically unsaturated monomers feed composition is simultaneously and continuously entering the polymerization zone and as the polymer is produced therein it varies in particle morphology in accord with the compositional content of the reactants mixture in the polymerization zone. As is apparent from the prior description either or both of the primary or secondary feed source can contain more than one polymerizable reactant.

The variations in the engineering arrangements of the primary and secondary feed sources are innumerable and no attempt will be made to set forth each specific tank configuration or arrangement possible; these can readily be devised by skilled individuals at will for the purpose of obtaining maximum operational efficiency of for the purpose of obtaining products having certain desired properties. In the preceding paragraph there has been outlined a simple arrangement employing a single primary feed source and a single secondary feed source. Slightly more complex arrangements would be those wherein there was a single primary feed source and a plurality of secondary feed sources; in these instances all of the secondary feed sources could be feeding in parallel directly into the primary feed source or some of the secondary feed sources could be feeding in series to other secondary feed sources with at least one secondary feed source, whether in series or not, ultimately feeding directly into the primary feed source. Other arrangement would be those wherein there were a plurality of primary feed sources; in these instances there could be a single secondary feed source feeding into one or more of the plurality of the primary feed sources, or there could be a plurality of secondary feed sources all feeding in parallel directly into only one of the primary feed sources, or a plurality of secondary feed sources directly feeding into more than one primary feed source or all of the plurality of secondary feed sources could be feeding in series into only one of the primary feed sources, or the plurality of secondary feed sources can be feeding in series into more than one of the primary feed sources. When a plurality of secondary feed sources is used they can be used in any combination desired, all can be used in series, some can be used in series while others are not, or none need be used in series with all of them being added directly to the primary feed source. In all instances the primary feed sources feed the primary polymerizable ethylenically unsaturated monomers feed composition to the polymerization zone; the secondary feed sources feed the secondary polymerizable ethylenically unsaturated monomers feed composition directly to the primary feed source or in series to another secondary feed source with the reactants therein ultimately terminating in the primary feed source before entering the polymerization zone. During these movements of reactants from one feed source to another there is a resultant continual change in the compositional content of the contents of the tank or reactors to which polymerizable reactant is added and the contents of the tanks or reactors are agitated to obtain efficient mixing of the contents therein. One can also vary the process by having periods of time at the start, during, or near the end of the reaction wherein there is feeding of primary polymerizable ethylenically unsaturated monomers feed composition from the primary feed source into the polymerization reactor without any simultaneous feeding of secondary polymerization ethylenically unsaturated monomers feed composition into the primary feed source or tank for a selected period of time. In addition, the flow rates between feed tanks or polymerization zone can be varied at will at any time during the polymerization reaction. One can also, with suitable known means, using variable feed valves, feed polymerizable reactants from a plurality of secondary feed sources through an in-line mixer which serves as the primary feed source wherein the primary polymerizable ethylenically unsaturated monomers feed composition is produced. The in-line mixer then feeds the primary polymerizable feed composition directly into the polymerization zone.

The processes of this invention can be used to emulsion polymerize any mixture of polymerizable reactants that will co-react or copolymerize with each other at a rate such that there is no substantial build-up of any one reactant or group of reactants while the other reactants are reacting and forming an emulsion latex polymer. The invention is not restricted to any limited group or class of polymerizable reactants, the process is broad in its application and use.

The concentrations of a particular polymerizable reactant initially present in the primary polymerizable ethylenically unsaturated monomers feed composition or initially present in the secondary polymerizable ethylenically unsaturated monomers feed composition can vary from 0.01 weight percent to 100 weight percent based on the total weight of polymerizable reactants initially present in the particular feed stream. These concentrations can be varied at the will of the skilled individual, as is recognized in the art, to obtain the particular final concentrations of each reactant in the emulsion latex or to obtain a particular property or characteristic in the latex polymer. The rates of flow from secondary feed sources and from primary feed sources can also be varied at the will of the skilled individual and do not require elaborate discussion herein. The process employs the temperature and pressure conditions known suitable for the reactants employed in emulsion polymerizations.

Among the polymerizable reactants that can be used in producing emulsion latexes by the processes of this invention are those containing at least one polymerizable carbon-to-carbon unsaturated bond. These compounds are well known and any attempt to list them all would be unnecessary. Illustrative thereof, however, one can mention the unsaturated compounds such as ethylene, propylene, 1-butene, 2-butene, isobutylene, 1-pentene, 2-methyl-2-butene, 1-hexene, 4-methyl 1-1-pentene, 3,3-dimethyl-1-butene, 2,4,4-trimethyl-1-pentene, 6-ethyl-1-hexene, 1-heptene, 1-octene, 1-decene, 1-dodecene, allene, butadiene, isoprene, chloroprene, 1,5-hexadiene, 1,3,5-hexatriene, divinylacetylene, cyclopentadiene, dicyclopentadiene, norbornene, norbornadiene, methylnorbornene, cyclohexene, styrene, alpha-chlorostyrene, alpha-methylstyrene, allylbenzene, phenylacetylene, 1-phenyl-1,3-butadiene, vinylnaphthalene, 4-methylstyrene, 4-methoxy-3-methylstyrene, 4-chlorostyrene, 3,4-dimethyl-alphamethylstyrene, 3-bromo-4-methyl-alpha-methylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 1,4-dihydroxystyrene, 3-nitrostyrene, 2-aminostyrene, 4-N,N-dimethylaminostyrene, 4-phenylstyrene, 4-chloro-1-vinylnaphthalene, acrylic acid, methacrylic acid, acrolein, methacrolein, acrylonitrile, methacrylonitrile, acrylamide, methacrylamide, methyl acrylate, methyl methacrylate, norbornenyl acrylate, norbornyl diacrylate, 2-hydroxyethyl acrylate, 2-phenoxyethyl acrylate, trimethoxysilyloxypropyl acrylate, dicyclopentenyl acrylate, cyclohexyl acrylate, 2-tolyloxyethyl acrylate, N,N-dimethylacrylamide, isopropyl methacrylate, ethyl acrylate, methyl alphachloroacrylate, beta-dimethylaminoethyl methacrylate, N-methyl methacrylamide, ethyl methacrylate, 2-ethylhexyl acrylate, neopentyl glycol diacrylate, cyclohexyl methacrylate, hexyl methacrylate, 2-methylcyclohexyl methacrylate, beta-bromoethyl methacrylate, benzyl methacrylate, phenyl methacrylate, neopentyl methacrylate, butyl methacrylate, chloroacrylic acid, methyl chloroacrylic acid, hexyl acrylate, dodecyl acrylate, 3-methyl-1-butyl acrylate, 2-ethoxyethyl acrylate, phenyl acrylate, butoxyethoxyethyl acrylate, 2-methoxyethyl acrylate, isodecyl acrylate, pentaerythritol triacrylate, methoxy poly(ethyleneoxy)$_{12}$ acrylate, tridecoxy poly(ethyleneoxy)$_{12}$ acrylate, chloroacrylonitrile, dichloroisopropyl acrylate, ethacrylonitrile, N-phenyl acrylamide, N,N-diethylacrylamide, N-cyclohexyl acrylamide, vinyl chloride, vinylidene chloride, vinylidene cyanide, vinyl fluoride, vinylidene fluoride, trichloroethene, vinyl acetate, vinyl propionate, vinyl butyrate, vinyl benzoate, vinyl butyral, vinyl chloroacetate, isopropenyl acetate, vinyl formate, vinyl methoxyacetate, vinyl caproate, vinyl oleate, vinyl adipate, methyl vinyl ketone, methyl isopropenyl ketone, methyl alpha-chlorovinyl ketone, ethyl vinyl ketone, divinyl ketone, hydroxymethyl vinyl ketone, chloromethyl vinyl ketone, allilydene diacetate, methyl vinyl ether, isopropyl vinyl ether, butyl vinyl ethers, 2-ethylhexyl vinyl ether, 2-methoxyethyl vinyl ether, 2-chloroethyl vinyl ether, methoxyethoxy ethyl vinyl ether, hydroxyethyl vinyl ether, aminoethyl vinyl ether, alpha-methylvinyl methyl ether, divinyl ether, divinyl ether of ethylene glycol or diethylene glycol or triethanolamine cyclohexyl vinyl ether, benzyl vinyl ether, phenethyl vinyl ether, cresyl vinyl ether, hydroxyphenyl vinyl ether, chlorophenyl vinyl ether, naphthyl vinyl ether, dimethyl maleate, diethyl maleate, di(2-ethylhexyl) maleate, maleic anhydride, dimethyl fumarate, dipropyl fumarate, diamyl fumarate, vinyl ethyl sulfide, divinyl sulfide, vinyl p-tolyl sulfide, divinyl sulfone, vinyl ethyl sulfone, vinyl ethyl sulfoxide, vinyl sulfonic acid, sodium vinyl sulfonate, vinyl sulfonamide, vinyl benzamide, vinyl pyridine, N-vinyl pyrollidone, N-vinyl carbazole, N-(vinyl benzyl)-pyrrolidine, N-(vinyl benzyl) piperidine, 1-vinyl pyrene, 2 isopropenyl furan, 2-vinyl dibenzofuran, 2-methyl-5-vinyl pyridine, 3-isopropenyl pyridine, 2-vinyl piperidine, 2-vinyl quinoline, 2-vinyl benzoxazole, 4-methyl-5-vinyl thiazole, vinyl thiophene, 2-isopropenyl thiophene, indene, coumarone, 1-chloroethyl vinyl sulfide, vinyl 2-ethoxyethyl sulfide, vinyl phenyl sulfide, vinyl 2-naphthyl sulfide, allyl mercaptan, divinyl sulfoxide, vinyl phenyl sulfoxide, vinyl chlorophenyl sulfoxide methyl vinyl sulfonate, vinyl sulfoanilide, and the like. In some instances, the particular monomer used may desirably be at a concentration below about two percent by weight to avoid unduly high viscosities of the latex. As an illustration, the presence of ten weight percent vinyl pyridine results in a thick viscous mass at low solids content even though the latex composition appears to be forming satisfactorily at the start of the polymerization reaction.

The polymerizable feed compositions can contain in the usual known amounts, dispersion aids, emulsifiers, photosensitizers, colorants, activators, catalysts, and other additives conventionally used in polymerization reactions, all of which are known, as are their uses.

Any of the known dispersion agents can be used at the conventional concentrations, hydroxyethyl cellulose, carboxymethyl cellulose, poly(vinyl alcohol), methyl cellulose, sulfated cellulose, and the like.

Any of the known emulsifiers can be used at a total concentration preferably below one percent by weight based on the total weight of polymerizable reactants charged. Among the useful emulsifying agents there are included soaps, sulfonated alkylbenzenes, alkylphenoxyethyl sulfonates, sodium lauryl sulfonate, salts of long chain amines, salts of long chain carboxylic or sulfonic acids, allylphenol ethoxylates, linear alcohol ethoxylates, or any other emulsifying agent.

In a typical embodiment of the process of this invention there is charged to a polymerization zone a mixture of water, initiator and surfactant or dispersion agent. There is prepared in a primary feed source a primary polymerizable ethylenically unsaturated monomers feed composition containing the selected monomers and optionally crosslinker. There is also prepared in a secondary feed source a secondary polymerizable ethylenically unsaturated monomers feed composition of selected monomers and at some time initially or during the polymerization reaction a selected chain transfer agent is introduced to this feed composition. The contents of the polymerization zone are heated to the desired reaction temperature and the monomers feeds are started. The contents of the primary feed source are introduced into the polymerization zone at a selected rate and simultaneously the contents of the secondary feed source are introduced into the primary feed source at a selected rate and thoroughly mixed therein. At the completion of the addition of the primary feed source contents to the polymerization zone, the contents thereof are stirred for an additional period of time and thereafter the improved emulsion polymerized latex composition is recovered.

As indicated, the polymers produced are constantly changing in composition and molecular weight during the polymerization reaction. Consequently measurement of molecular weight of the spectrum-like polymer compositions presents problems because a single solvent generally will not solvate all of the polymer particles equally. In addition, attempts to fractionate the polymers produced by our process by the solvent/non-solvent fractionation techniques have also presented problems because the polymers produced tend to fractionate both on monomeric composition in the polymer molecule as well as on molecular weight of the polymer molecule. Therefore, a method has been developed for obtaining an average resin grade value as an index of the molecular weight. In this method a standard solution viscosity determination is used to estimate the index of the polymer molecular weight and this value is reported as the "resin grade". Resin grade is defined herein as the viscosity, in centistokes, at 30° C. of a 2 weight percent nonvolatiles solution of the polymer latex particles in a suitable solvent; usually methyl ethyl ketone, unless otherwise indicated. In those instances in which an internal crosslinker is employed during production of the latex emulsion, the polymer, or parts of it, is often not completely soluble in the solvent due to the crosslinked, network structure of the polymer molecule. In these instances the test solutions are hazy and the validity of the resin grade determination, as regards average molecular weight of the entire polymer composition, is representative as an index of changes in molecular weight from one latex emulsion to another. In this respect the resin grade determination is useful to establish differences between two latex emulsions even though it is not a true measurement of the average molecular weight of the polymers in the emulsion.

The following examples serve to illustrate the invention. Parts are by weight unless otherwise indicated. Pigmented paints were produced with some of the above latexes. A pigment grind was prepared containing titanium dioxide, a commercial pigment dispersant, a surfactant, ethylene glycol, N,N-dimethylethanolamine, a commercial defoamer and water. A portion of this pigment grind was then added to a composition containing water, N,N-dimethylethanolamine, the latex emulsion, hexamethoxymethylmelamine and 2-butoxyethanol and stirred until homogeneous. These paints were applied to steel panels and generally cured for 10 to 20 minutes at 350° F. These results are set forth in Table I.

EXAMPLE 1

The polymerization reaction system consisted of a polymerization zone or reactor equipped with a stirrer, thermometer, inlet for polymerizable reactants, nitrogen inlet and condenser. Connecting directly to the polymerization zone throughout the inlet or the polymerizable reactants was the primary feed source or tank which was equipped with a stirrer; connecting into the primary feed source was a secondary feed source or tank.

There was charged to the polymerization zone 775 ml. of distilled water and the temperature was raised to 75° C. At this temperature there were added 3.5 grams of ammonium persulfate and 1.5 grams of the sodium salt of the dioctyl ester of sulfosuccinic acid and the mixture was stirred and heated for about 10 minutes.

The primary polymerizable ethylenically unsaturated monomers feed composition in the primary feed source had an initial content of 60 grams of styrene, 210 grams of ethyl acrylate, 15 grams of methacrylic acid, and 15 grams of 2-hydroxyethyl acrylate. The secondary polymerizable ethylenically unsaturated monomers feed composition in the secondary feed source had an initial content of 210 grams of styrene, 60 grams of ethyl acrylate, 15 grams of methacrylic acid, 15 grams of 2-hydroxyethyl acrylate and 1.5 grams of butyl mercaptan. The contents of the primary feed source were fed into the polymerization zone at a rate of 5 grams per minute while simultaneously introducing into the primary feed source from the secondary feed source the contents of said secondary feed source at a rate of 2.5 grams per minute. During these simultaneous feeds, the contents of the polymerization zone and of the primary feed source were efficiently stirred and the temperature in the polymerization zone was maintained at about 80° C. throughout the reaction. The feeding sequences caused a continual change in the compositional content of the reactants present in the primary polymerizable ethylenically unsaturated monomers feed composition located in the primary feed source and thus, a continual change in the compositonal content of the reactants introduced into the polymerization zone. Among these changes was a continual gradual increase of the concentration of the butyl mercaptan in the primary feed source during the reaction. After the end of the feed of polymerizable reactants to the polymerization zone, the mixture was stirred for an additional hour at 80° C., then cooled and the emulsion latex was recovered. This latex had a solids content of about 44 weight percent and a Brookfield viscosity of 10 to 20 cps. at 25° C. The pH was adjusted to 7.5 with N,N-dimethylethanolamine; the overall composition of the monomers in the spectrum polymer produced was 45/45/5/5 styrene/ethyl acrylate/methacrylic acid/2-hydroxyethyl acrylate. Films produced from this composition had good gloss and flexibility.

For comparative purposes, a latex emulsion (Comparative A) was produced by the same procedure but omitting the butyl mercaptan chain terminator from the reaction mixture. The latex emulsion obtained produced films having somewhat less gloss and slightly improved flexibility.

The data shows that one can increase the gloss of a film by controlling and broadening the molecular weight distribution, this being accomplished in our process by careful control and gradually increasing the concentration of the chain terminator to the polymerization zone during the course of the reaction. The latex emulsion composition produced by the process of this invention had a broader molecular weight distribution than the comparative latex emulsion composition.

EXAMPLE 2

A latex emulsion was produced following essentially the same procedure described in Example 1 and using the same quantities of reactants in the polymerization zone, primary feed source and secondary feed source. This example differs from Example 1 in that the butyl mercaptan chain terminator was added to the secondary feed source after half of the contents thereof had previously been fed into the primary feed source. The polymerization reaction and polymer recovery were in all other respects similar to that of Example 1 and the latex emulsion recovered had a Brookfield viscosity of about 10 cps. at 25° C. This latex emulsion produced coatings having good gloss, fair flexibility and the emulsion itself had an improved viscosity stability when compared to the latex emulsion of Example 1. The manner in which the chain terminator was added provides a broader molecular weight distribution than obtained in the latex polymer of the comparative described in Example 1.

EXAMPLE 3

The procedure described in Example 2 was followed. In this example the primary feed source additionally originally contained 0.75 gram of neopentyl glycol diacrylate as crosslinking agent. The latex emulsion produced had a Brookfield viscosity of 10 cps. at 25° C. The viscosity stability of this product was excellent. The emulsion latex, because of the manner in which the chain terminator was added, had a broader molecular weight distribution than did the comparative latex polymer discussed in Example 1. The films had high gloss and satisfactory flexibility.

EXAMPLE 4

A latex emulsion was produced following the procedure described in Example 1. In this example there was also present in the primary feed source 1.5 grams of neopentyl glycol diacrylate; the secondary feed source contained 1.5 grams of butyl mercaptan. The latex emulsion produced showed the presence of a large amount of scrap, generated as a result of the high initial concentration of crosslinker in the primary feed source in conjunction with a relatively high initial addition of the chain terminator from the beginning of the polymerization reaction. While a latex emulsion of broader molecular weight distribution was obtained, the example illustrates the benefits to be derived by delaying the addition of chain terminator when a crosslinker is also present in the reaction mixture.

For comparative purposes, a latex emulsion (Comparative B) was made with the same reactants and following the same procedure with the exception that the chain terminator, butyl mercaptan, was not used at any time. There was produced a latex emulsion having a narrower molecular weight distribution than the product that was discussed in the immediately preceding paragraph.

EXAMPLE 5

In a manner similar to that described in Example 1 a latex emulsion was produced using the same quantities of monomers in the primary feed source and the secondary feed source. In this example the difference was that 0.375 part of butyl mercaptan was added to each of the primary feed source and secondary feed source at that point in time of the reaction when about two thirds of the monomers had been introduced to the polymerization zone. This resulted in a more rapid decrease in molecular weight of the polymer produced after the chain transfer agent was introduced to both feed sources. The aqueous latex emulsion had a broader molecular weight distribution than did the comparative discussed in Example 1; it had a Brookfield viscosity of 30 cps. at 25° C. and coatings produced therefrom had improved flexibility and fair gloss. The viscosity stability of the emulsion was good.

EXAMPLE 6

In a manner similar to that described in Example 1 a latex emulsion was produced using the same reactants and quantities set forth therein except that dodecyl mercaptan replaced the butyl mercaptan. This was used to produce a pigmented coating; the data is presented in Table I; the amounts in the table are in grams.

TABLE I

| Example | 1 | 2 | 3 | 4 | 5 | 6 |
|---|---|---|---|---|---|---|
| Pigment Grind, grams | | | | | | |
| Titanium dioxide | 3,000 | 3,000 | → | → | 4,000 | 12,000 |
| Dispersant | 50 | 89 | → | → | 134 | 402 |
| Surfactant | 10 | 10 (a) | → | → | 40 | 120 |
| Ethylene glycol | 25 | 30 | → | → | 60 | 180 |
| N,N-Dimethylethanolamine | 18 | — | — | — | 2 | 6 |
| Defoamer | 0.6 | 0.5 | → | → | 5 | 10 |
| Water | 1,000 | 1,110 | → | → | 860 | 3,000 |
| Latex | 600 (b) | 600 (b) | → | → | — | — |
| Let-Down, grams | | | | | | |
| Water | 170 | 290 | 375 | — | 175 | 130 |
| N,N-Dimethylethanolamine | 17 | 30 | 30 | 40 | 7.1 | 6.2 |
| Latex | 300 | 600 | 600 | 600 | 600 | 600 |
| Hexamethoxymethylmelamine | 27.7 | 55.4 | 55.8 | 27.7 | 51.3 | 51.9 |
| 2-Butoxyethanol | 16.6 (c) | 33.3 | 33.5 | 30.5 (c) | 30.9 | 31.1 |
| Pigment Grind, above | 183 | 375.5 | 377.7 | 344.4 | 275 | 285.5 |
| Properties of Coating | | | | | | |
| Gloss | 87/63 | 92/70 | 93/75 | 75/26 | 87/68 | 92/82 |
| Gardner Impact, in-lb Forward/Reverse | — | 40/4 | 40/12 | 20/4 | 60/25 | 35/8 |
| Viscosity Stability | Poor | Fair | Exc. | Exc. | Good | Poor |

(a) Adduct of 10 moles of ethylene oxide with nonyl phenol
(b) A master batch of a latex produced as described in Example 1
(c) Phenylglycol ether

EXAMPLE 7

In a manner similar to that described in Example 1 a latex emulsion was produced using an original mixture of 100 grams of styrene, 280 grams of ethylacrylate, 20 grams of acrylic acid, 6 grams of neopentylglycol diacrylate and 6 grams of the disodium salt of dioctylsulfosuccinic acid (DSDOS) in the primary feed source; the mixture in the secondary feed source was 280 grams of styrene, 80 grams of ethyl acrylate, 40 grams of the disodium salt of dioctylsulfosuccinic acid. Twelve grams of trichloroethylene were introduced into the secondary feed source after half the original contents thereof had been fed into the primary feed source. The latex emulsion heat cured to a dry film of satisfactory gloss.

EXAMPLE 8

In a manner similar to that described in Example 1 a latex emulsion was produced using an original mixture of 90 grams of methyl methacrylate, 200 grams of butyl acrylate, 10 grams of methacrylic acid, 4 grams of DSDOS and 0.75 gram of polyethylene glycol (200) diacrylate in the primary feed source; the mixture in the secondary feed source was 210 grams of methyl methacrylate, 70 grams of butyl acrylate, 20 grams of methacrylic acid and 2 grams of DSDOS. After ⅜ of the original contents of the secondary feed source had been fed to the primary feed source, 0.5 gram of butyl mercaptan was added to the remainder of the mixture in the secondary feed source and the reaction continued until both feed sources were empty. The latex emulsion formed heat cured coatings of good gloss.

EXAMPLE 9

In a manner similar to that described in Example 1 a latex emulsion was produced using an original mixture of 60 grams of methyl methacrylate, 30 grams of styrene, 200 grams of butyl acrylate, 5 grams of hydroxyethyl acrylate, 2 grams of the diacrylate ester of 2,2-dimethyl-3-hydroxypropyl 2,2-dimethyl-3-hydroxypropionate and 4 grams of DSDOS in the primary feed source; the mixture in the secondary feed source was 120 grams of methyl methyacrylate, 90 grams of styrene, 70 grams of butyl acrylate, 10 grams of methacrylic acid, 10 grams of hydroxyethyl acrylate and 2 grams of DSDOS. After ½ of the original contents of the secondary feed source had been fed into the primary feed source, 1.5 grams of butyl mercaptan was added to the remainder of the mixture in the secondary feed source and the reaction continued until both feed sources were empty. The latex emulsion was used to produce clear and pigmented coatings of good properties.

EXAMPLE 10

In a manner similar to that described in Example 1, a latex was produced using an original mixture of 60 grams of methyl methacrylate, 30 grams of styrene, 210 grams of butyl acrylate, 0.75 gram of 1,6-hexanediol diacrylate and 4 grams of DSDOS in the primary feed source; the mixture in the secondary feed source was 120 grams of methyl methacrylate, 90 grams of styrene, 60 grams of butyl acrylate, 15 grams of methacrylic acid, 15 grams of hydroxyethyl acrylate and 2 grams of DSDOS. After ⅜ of the original contents of the secondary feed source had been fed into the primary feed source, 1.5 grams of butyl mercaptan was added to the remainder of the mixture in the secondary feed source and the reaction continued until both feed sources were empty. The latex emulsion was used to produce a white coating composition having excellent flexibility.

EXAMPLE 11

In a manner similar to that described in Example 1 a latex emulsion was produced using an original mixture of 37 grams of styrene, 218 grams of ethyl acrylate, 30 grams of methacrylic acid, 15 grams of hydroxyethyl acrylate, 1.5 grams of butyl mercaptan and 5 grams of DSDOS in the primary feed source; the mixture in the secondary feed source was 203 grams of styrene, 52 grams of ethyl acrylate, 30 grams of methacrylic acid, 15 grams of hydroxyethyl acrylate and 3.5 grams of DSDOS. The latex emulsion was used to produce a white paint that had excellent gloss.

What is claimed is:

1. A process for controlling the particle morphology and molecular weight distribution of emulsion polymerized latex polymers, said process comprising introducing at least one primary polymerizable ethylenically unsaturated monomers feed composition containing from 0 to 5 weight percent of a chain transfer agent and from 0 to 5 weight percent of at least one crosslinking agent from at least one primary feed source to a polymerization zone, said primary polymerizable ethylenically unsaturated monomers feed composition continually varying in compositional content by the simultaneous addition thereto during its introduction to the polymerization zone, from at least one secondary feed source, of at least one secondary polymerizable ethylenically unsaturated monomers feed composition containing from 0 to 5 weight percent of a chain transfer agent and from 0 to 5 weight percent of at least one crosslinking agent so as to continually change the compositional content of the primary polymerizable ethylenically unsaturated monomers feed composition in said primary feed source during the addition thereto of said secondary polymerizable ethylenically unsaturated monomers feed composition, and simultaneously polymerizing the primary polymerizable ethylenically unsaturated monomers feed composition introduced to the polymerization zone whereby emulsion polymerized latex polymer of broadened molecular weight distribution is produced; with the proviso that there be a positive amount of said chain transfer agent in at least one of said feed compositions during at least a portion of the polymerization period.

2. A process as claimed in claim 1, wherein the concentration of chain transfer agent is from 0.05 to 1 weight percent.

3. A process as claimed in claim 1, wherein the concentration of chain transfer agent is from 0.1 to 0.5 weight percent.

4. A process as claimed in claim 1, wherein the concentration of crosslinking agent is from 0.05 to 1 weight percent.

5. A process as claimed in claim 1, wherein the chain transfer agent is originally present solely in the secondary polymerizable ethylenically unsaturated monomers feed composition.

6. A process as claimed in claim 1, wherein the crosslinking agent is originally present in the primary polymerizable ethylenically unsaturated monomers feed composition.

7. A process as claimed in claim 1, wherein the chain transfer agent is present in the secondary polymerizable ethylenically unsaturated monomers feed composition for a period of time less than the entire period of time required to add said feed composition to the primary feed source from the secondary feed source.

8. A process as claimed in claim 1, wherein the chain transfer agent is an organic mercaptan.

9. A process as claimed in claim 1, wherein the chain transfer agent is butyl mercaptan.

10. A process as claimed in claim 1, wherein the chain transfer agent is dodecylmercaptan.

11. A polymer produced by the process of claim 1.